United States Patent [19]
Henderson

[11] Patent Number: 5,799,953
[45] Date of Patent: Sep. 1, 1998

[54] CAPPED SPRING-ENERGIZED SEAL

[75] Inventor: Gary L. Henderson, Arvada, Colo.

[73] Assignee: American Variseal, Broomfield, Colo.

[21] Appl. No.: 450,467

[22] Filed: May 25, 1995

[51] Int. Cl.[6] .................................................. F16J 15/32
[52] U.S. Cl. .......................... 277/554; 277/567; 277/582
[58] Field of Search ........................... 277/164, 165, 277/205, 199, 227, 153, 162, 163, 554, 567, 582

[56] References Cited

U.S. PATENT DOCUMENTS

| | | | |
|---|---|---|---|
| 3,114,561 | 12/1963 | Creath et al. | 277/205 |
| 3,223,426 | 12/1965 | Reid | 277/153 |
| 3,554,567 | 1/1971 | Carroll | 277/164 |
| 3,669,460 | 6/1972 | Wysong | 277/165 |
| 3,687,464 | 8/1972 | Jackson et al. | 277/153 |
| 3,866,925 | 2/1975 | Maimstrom | 277/164 |
| 3,885,801 | 5/1975 | Scannell | 277/165 |
| 4,103,909 | 8/1978 | Hoffman et al. | 277/205 |
| 4,453,723 | 6/1984 | Greenwald | 277/165 |
| 4,592,558 | 6/1986 | Hopkins | 277/205 |
| 4,618,154 | 10/1986 | Freudenthal | 277/205 |
| 4,658,847 | 4/1987 | McCrone | 277/205 |
| 4,687,212 | 8/1987 | Timpson, Jr. | 277/205 |
| 4,706,970 | 11/1987 | Ramirez | 277/205 |
| 4,743,033 | 5/1988 | Guess | 277/205 |
| 5,163,692 | 11/1992 | Schofield | 277/153 |

*Primary Examiner*—Daniel G. DePumpo
*Attorney, Agent, or Firm*—Baker & Daniels

[57] ABSTRACT

The present invention involves a seal ring for sealing an annular space between two components. The seal ring includes an annular jacket, a spring, and a cap. The jacket includes an annular cavity defined by two annular lips. The spring is disposed within the annular cavity of the jacket. The cap is disposed over the annular lips, and encapsulates the annular cavity. The spring biases the lips against the cap to thereby seal the annular cavity. Either the cap or the jacket includes a pair of annular channels, and the other includes a pair of annular projections, so that the projections and channels interfit to thereby lock together the cap and jacket. The cap and jacket are made from a polymer material, although not necessarily the same polymer material. The spring may be cantilevered, helical ribbon coil, slanted coil, or silicone filled with one or more spring elements. The lips of the jacket may have flanges to trap the spring in the annular cavity. The cap may have a leading edge, multiple leading edges, or a chamfered design, with axial or radially inward or outward faceseals.

22 Claims, 2 Drawing Sheets

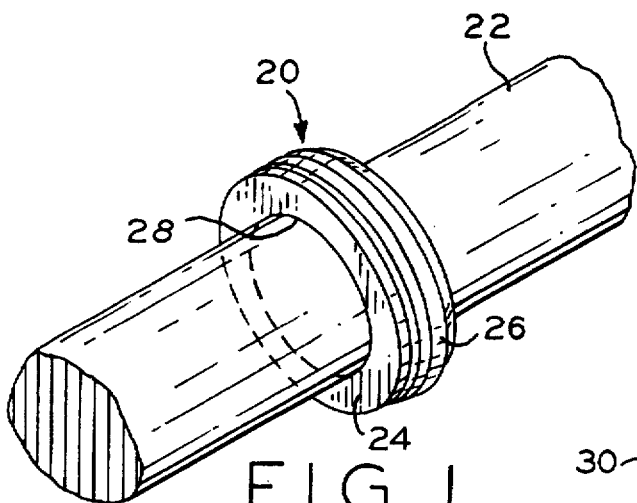
FIG_1
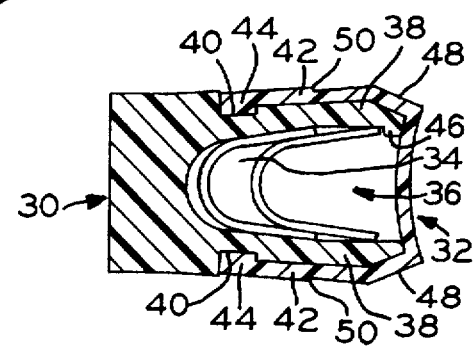
FIG_2
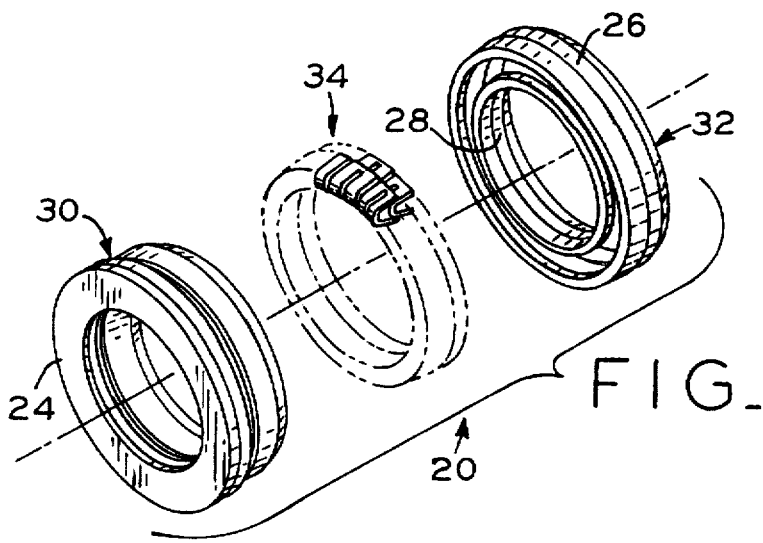
FIG_3
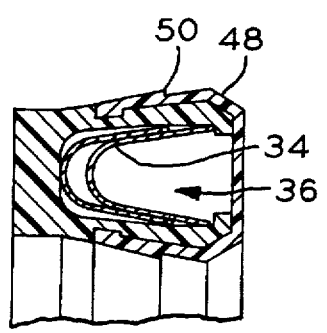
FIG_4
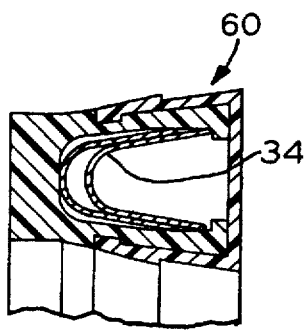
FIG_5
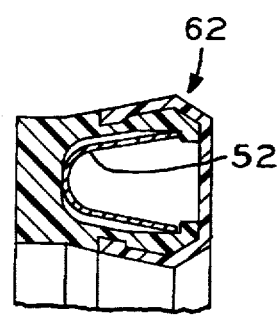
FIG_6

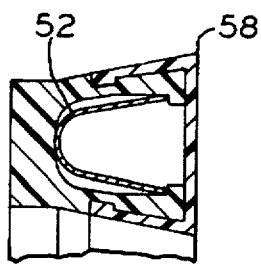
FIG_7
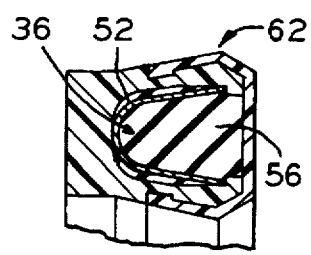
FIG_8
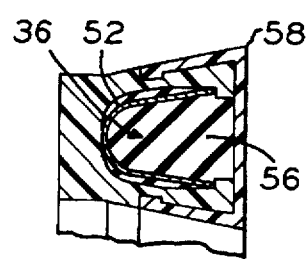
FIG_9
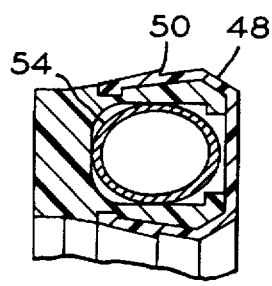
FIG_10
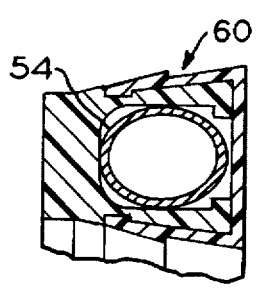
FIG_11
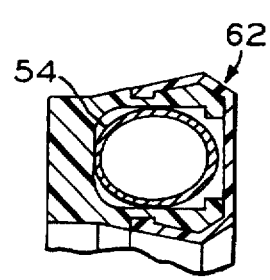
FIG_12
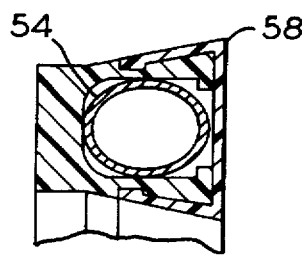
FIG_13
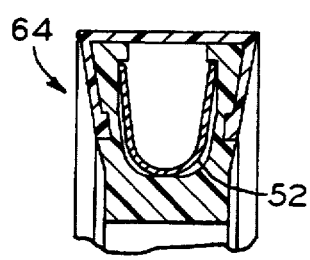
FIG_14
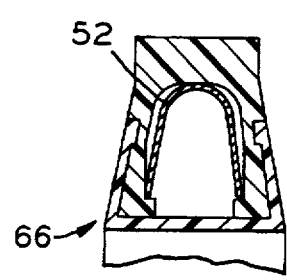
FIG_15
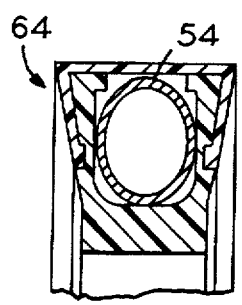
FIG_16
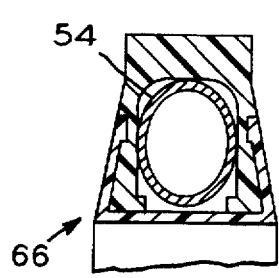
FIG_17
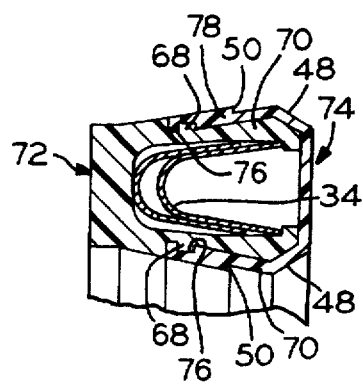
FIG_18

CAPPED SPRING-ENERGIZED SEAL

BACKGROUND OF THE INVENTION

1. Field of the Invention

The present invention relates to seals. More particularly, the field of the invention is that of spring-energized seals.

2. Description of the Related Art

Spring-energized seals have been used for years. Spring-energized seals are used in a manner similar to conventional elastomer seals, e.g., an o-ring. Elastomer seals often fail due to conditions often present in their operating environment, such as: chemical attack, extreme heat or cold, extrusion, friction, or compression set. However, spring-energized seals have a different structure and do not behave like a conventional elastomer to avoid such causes of seal failure. These spring-energized seals include a jacket made of high-performance polymers which are associated with a metal spring or similar device. These seals are useful in a variety of applications, such as: rod and piston seals, face seals, and rotary shaft seals.

The basic spring-energized seal design has two components: a U-shaped jacket made of high performance polymeric seal materials and a metal spring-loading device. The U-shaped jacket is pressure actuated so that fluid pressure of the fluid being contained by the seal energizes the sealing lips, forcing the seal surface of the lips against the mating hardware. As the fluid pressure increases, so does the load on the sealing lips to enhance the resulting sealing contact. The jackets are machined rather than injection-molded, so that the exterior contour of the seal may be easily enhanced for a specific surface contour. Because of the polymeric material and the machined jackets, these spring-energized seals are adaptable to almost any application.

The spring of the spring-energized seal is disposed within the jacket, providing a biasing force against the sealing lips. The spring is typically stainless steel. When the fluid pressure is insufficient to bias the lips, the spring supplies all of the load required for biasing the sealing lips into the surrounding hardware. Additionally, the spring compensates for variations in gland tolerances and normal wear of the seal. As a seal loading device, a metal spring is more accurate than other devices (such as elastomer O-rings) for the control of friction. Three types of metal springs are typically used: a cantilever-beam spring, a round wire in a slanted coil, and a helical-ribbon spring. The load ratings of the spring required for a particular application may be tailored to the application's linear-friction or torque requirements.

The material of the jacket has several typical characteristics: low friction, high-speed service, universal chemical compatibility, low and high temperature capability, high-pressure rating, and permanent elasticity with immunity to aging, embitterment, and compression-set. There are several types of polymers which provide those properties: polytetrafluoroethylene (PTFE) resins, other fluoropolymers such as the copolymer of ethylene/tetrafluoroethylene (ETFE), thermoplastic-elastomer (TPE) compounds, ultrahigh-molecular-weight polyethylene (UHMWPE) compounds, and high-modulus thermoplastics such as polyetheretherketone (PEEK).

However, applications which involve corrosive media being present adjacent to the seal ring, even the highest quality stainless steel may be subject to corrosion. If the material of the spring deteriorates to the point that it can no longer contribute to the sealing of the seal ring, then seal failure may occur. Corrosive environments are similarly destructive to elastomeric materials. Although it is known to embed a spring in an elastomer seal for retention of the spring, this method provides only marginal protection from corrosive environments. Further, embedding a spring in a polymer would limit the effectiveness of the spring, and would require that the polymer seal bodies be made by injection molding instead of the more precise manufacturing method of machining.

Therefore, what is needed is a more effective seal for corrosive environments.

SUMMARY OF THE INVENTION

The present invention is an improved spring-energized seal for sealing an annular space between two components. The annular jacket of the seal has annular sealing lips-defining an annular cavity. The spring is disposed within the annular cavity and the cap is disposed over the sealing lips and encapsulates the annular cavity. The spring biases the sealing lips against the cap to thereby seal the annular cavity and protect the spring.

The seal of the present invention is designed especially for applications which require zero metal exposure, that is, applications in such corrosive environments that any exposed metal will be subject to destruction. The seal jacket encases one or more spring energizers and/or silicone filling. The cap snaps over the sealing lips completely enclosing the annular cavity housing the spring. The snapping action of the cap locks the cap to the sealing lips, and the spring biasing actually enhances the connection of-the cap to the jacket. In addition, the spring biases the seal into engagement with both components which define the annular space housing the seal. The seal jacket and cap are made with polymer materials, although they do not need to be made of the same type of polymer.

In addition to protecting the spring disposed within the jacket, the seal also eliminates the "dead volume" inherent in conventional spring-energized seals. For example, if a liquid being processed in a system is expensive, the small volume of that expensive material may significantly impact on the financial viability of the process. By using the present invention, the outer contour of the seal may be designed to completely fill the annular space between the two components. Therefore, any "dead volume" would then be sealed off by the capped seal, so that none of the materials being processed would be left behind in the annular cavity of the seal jacket.

The present invention, in one form, is a seal ring for sealing an annular space between two components. The seal ring comprises a jacket, spring, and cap. The jacket is annular and includes an annular cavity defined by annular lips. The spring is disposed within the annular cavity. The cap is disposed over annular lips and encapsulates the annular cavity. The spring biases the lips against the cap to thereby seal the annular cavity. Further, the cap and lips include an interfitting structure to secure the two together.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a perspective view of a seal of the present invention disposed about a shaft.

FIG. 2 is a cross-sectional view of the seal of FIG. 1.

FIG. 3 is an exploded view of the seal of FIG. 1.

FIG. 4 is a cross-sectional view of another embodiment of the present invention.

FIG. 5 is a cross-sectional view of another embodiment of the present invention.

FIG. 6 is a cross-sectional view of another embodiment of the present invention.

FIG. 7 is a cross-sectional view of another embodiment of the present invention.

FIG. 8 is a cross-sectional view of another embodiment of the present invention.

FIG. 9 is a cross-sectional view of another embodiment of the present invention.

FIG. 10 is a cross-sectional view of another embodiment of the present invention.

FIG. 11 is a cross-sectional view of another embodiment of the present invention.

FIG. 12 is a cross-sectional view of another embodiment of the present invention.

FIG. 13 is a cross-sectional view of another embodiment of the present invention.

FIG. 14 is a cross-sectional view of another embodiment of the present invention.

FIG. 15 is a cross-sectional view of another embodiment of the present invention.

FIG. 16 is a cross-sectional view of another embodiment of the present invention.

FIG. 17 is a cross-sectional view of another embodiment of the present invention.

FIG. 18 is a cross-sectional view of another embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

A first embodiment of the invention is shown in FIGS. 1, 2, and 3. FIG. 1 shows seal 20 disposed around shaft 22. Seal 20 may be designed to seal on its face 24, on its outer periphery 26, or on is inner periphery 28 depending on the particular application. Seal 20 includes jacket 30 and cap 32, with spring 34 disposed within the structure created by interfitting jacket 30 and cap 32 as described in greater detail below. In this embodiment, spring 34 comprises two cantilevered springs which are disposed within internal cavity 36 defined between sealing lips 38 of jacket 30.

As shown in more detail in FIG. 2, sealing lips 38 of jacket 30 extend and engage cap 32. Sealing lips 38 define channels 40 on their exterior surface. Cap 32 includes arms 42 having projections 44 which engage and interfit with a corresponding one of channels 38. As spring 34 biases sealing lips 38 against arms 42, projection 44 is locked into channel 40 to secure cap 32 and jacket 30 together. This locking connection seals internal cavity 36 against the penetration of any potentially damaging fluids, and prevents any of the material circulating around seal 20 from being wasted inside. the dead space of seal 20.

Jacket 30 also includes flange 46 for retaining spring 34 within internal cavity 36. Flange 46 provides a positive stop against spring 34 exiting internal cavity 36, and thereby facilitates the manufacture of seal 20 by allowing for the separate assembly of spring 34 and jacket 30 previous to interfitting cap 32 and jacket 30.

The exterior surface of cap 32 may be varied to accomplish the desired seal for the contemplated application. The embodiment of FIG. 2 shows a design having chamfered leading edges 48 and second sealing edges 50. This type of design would be more appropriate for applications that have a difficult media to seal such as a light gas like Helium. There are multiple variations on the design of a seal made according to the present invention, and the examples given below show only a small sub-set of possible configurations.

For example, different types of springs may be used with the present invention. While FIGS. 4, 5, and 18 show two cantilevered springs such as shown in FIG. 2. However, single cantilevered spring 52 may also be used, as shown in FIGS. 6, 7, 8, 9, 14, and 15. Another possible type of spring is helical or coil spring 54, such as a helical ribbon or a slanted coil spring, as shown in FIGS. 10, 11, 12, 13, 16, and 17. In addition to, or in place of, a spring, internal cavity 36 may contain silicone compound 56 as shown in FIGS. 8 and 9.

The chamfered, double edge design of FIG. 2 is similar to the exterior designs shown in FIGS. 4, 10, and 18. Further, the exterior surface design may have single sharp leading edges 58 as shown in FIGS. 7, 9, and 13. This type of design would be more appropriate for applications that have a vicious media requiring a sharp leading edge to keep the media from leaking past the lip. Another exterior surface design may have sharp double leading edges 60 as shown in FIGS. 5 and 11. This type of design would be more appropriate for applications with dramatic increases in pressure or quick bursts of reciprocating motion that could force the media past a chamfered lip whether the media is a light gas, light fluid, or viscous media. Another exterior surface design includes single chamfered leading edge 62 as shown in FIGS. 6, 8, and 12. This type of design would be more appropriate for applications that require an encapsulated spring yet do not have difficult media, problematic motion, or dramatic pressure changes. The above mentioned examples are for forming sealing surfaces for opposing penetration of fluids in an axial direction.

The embodiments of FIGS. 14 and 16 show embodiments with externally disposed faceseal 64. Similarly, the embodiments of FIGS. 15 and 17 have internally disposed faceseals 66. When a hardware component cannot be manufactured in a way as to provide a solid end to a cylinder in which a piston may be reciprocating, a faceplate retained by some means such as bolting or welding is required. A gasket is often sufficient for proper sealing between these two pieces of mating hardware. Yet in applications where operating conditions warrant, a groove is machined into the face of one of the pieces of hardware and a seal is installed in the groove. FIGS. 14 and 16 show an external faceseal designed to seal a media external of the equipment and prevent the media from migrating into the equipment being sealed. For example, a submersible camera housing such as used in the filming of the Titanic at the bottom of the ocean would require external faceseals. FIGS. 15 and 17 show an internal faceseal designed to seal internal media from escaping into the surrounding atmosphere. For example, a large tank filled with liquid oxygen would require such a seal between the tank and the valve.

An alternative engaging structure is shown in FIG. 18. Projections 68 extend from sealing lips 70 of jacket 72, while cap 74 defines annular channels 76 at the end of its arms 78. Arms 78 extend over projections 68, which interfit with channels 76 to lock together jacket 72 and cap 74. The exterior surface of cap 74 and jacket 72 are similar to the embodiment shown in FIGS. 1–3. The interfitting structure of the embodiment shown in FIG. 18 is merely one alternative which provides the desired sealing of internal cavity 36, and other interconnecting structures are within the scope of the present invention. For example, it is possible to secure a film of a co-polymer of tetrafluoroethylene and a perfluorinated vinyl ether (PFA) between the locking members of the seal body and the cap. Then through heating of the entire assembly, the seal body, the PFA film, and the cap may permanently bond together. Another possible means of interconnecting the cap to the seal body would be to machine threads onto the lips of the seal body and into the interior of the legs of the cap so that the cap may be screwed over the seal body.

Jacket 30 and cap 32 may be made of polymer material, such as polytetrafluoroethylene (PTFE) resins, other fluoropolymers such as the copolymer of ethylene/tetrafluoroethylene (ETFE), thermoplastic-elastomer (TPE) compounds, ultrahigh-molecular-weight polyethylene (UHMWPE) compounds, high-modulus thermoplastics such as polyetheretherketone (PEEK), PFA materials, and other suitable materials having the ability to be machined. Other examples include high durometer rubber compounds and high durometer urethane compounds. However, jacket 30 and cap 32 need not be made of the same material. Spring 34 is typically made of metal such as stainless steel, although other suitable materials may include Hastelloy, Elgiloy (from the Elgin Company), Inconel, MP35N, Titanium, Haynes, or Incoloy. Helical ribbon springs typically have a thickness of about 0.004 inches, while slanted coil springs typically have a diameter of about 0.20 inches. Silicone material 56 may include compounds that come in a liquid or semi-liquid form that can be injected or poured into the spring cavity and become semi-rigid when exposed to the atmosphere or a curing agent.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A seal ring for sealing an annular space between two components, said seal ring comprising:
   an annular jacket including an annular cavity defined by first and second annular lips;
   a spring disposed within said annular cavity; and
   a cap disposed over said first and second annular lips, said cap encapsulating said annular cavity and said spring positioned against said lips to seal and lock said lips against said cap to thereby seal said annular cavity to prevent penetration of contaminants into said annular cavity.

2. The seal ring of claim 1 wherein one of said cap and said jacket includes a pair of annular channels, and the other of said cap and said jacket includes a pair of annular projections, respective ones of said annular channels and said annular projections interfitting to thereby lock together said cap and said jacket.

3. The seal ring of claim 1 wherein said jacket is made of a polymer material.

4. The seal ring of claim 1 wherein said cap is made of a polymer material.

5. The seal ring of claim 1 wherein said spring comprises a cantilevered spring.

6. The seal ring of claim 1 wherein said spring comprises a helical ribbon spring.

7. The seal ring of claim 1 wherein said spring comprises a silicone filling material.

8. The seal ring of claim 1 wherein said spring comprises a slanted coil spring.

9. The seal ring of claim 1 further comprising a second spring.

10. The seal ring of claim 1 wherein said cap includes a leading edge.

11. The seal ring of claim 10 wherein said cap includes a second leading edge.

12. The seal ring of claim 1 wherein said cap includes a chamfered edge.

13. The seal ring of claim 1 wherein said first and second lips have extending flanges at a distal end to trap said spring within said internal cavity.

14. The seal ring of claim 1 wherein said annular cavity is oriented in an axial direction and said cap includes faceseal generally perpendicular to said axial direction.

15. The seal ring of claim 1 wherein said annular cavity is oriented in a radially outward direction and said cap includes an external faceseal.

16. The seal ring of claim 1 wherein said annular cavity is oriented in a radially inward direction and said cap includes an internal faceseal.

17. A seal ring for sealing an annular space between two components, said seal ring comprising:
   an annular jacket including an annular cavity defined by first and second annular lips;
   a spring disposed within said annular cavity; and
   a cap disposed over said first and second annular lips, said cap including means for engaging said first and second annular lips, said cap encapsulating said annular cavity and said spring positioned against said lips to seal and lock said lips against said cap to thereby seal said annular cavity to prevent penetration of contaminants into said cavity.

18. The seal ring of claim 17 wherein said engaging means includes a pair of channels on one of said cap and said jacket, and a pair of projections on the other of said cap and said jacket, with respective ones of said projections engaging a corresponding one of said channels.

19. The seal ring of claim 17 wherein each of said first and second lips includes a channel, and said cap includes a pair of projections which engage a corresponding channel of said first and second lips.

20. The seal ring of claim 17 wherein said cap includes a pair of channels, and said jacket includes a pair of projections which engage corresponding channels of said cap.

21. A seal ring for sealing an annular space between two components, said seal ring comprising:
   an annular jacket including an annular cavity defined by first and second annular lips;
   a cantilevered spring disposed within said annular cavity; and a cap disposed over said first and second annular lips, said cap encapsulating said annular cavity and said spring biasing said lips against said cap to thereby seal said annular cavity.

22. A seal ring for sealing an annular space between two components, said seal ring comprising:

an annular jacket including an annular cavity defined by first and second annular lips;

a spring disposed within said annular cavity; and a cap disposed over said first and second annular lips, said first and second lips having extending flanges at a distal end to trap said spring within said internal cavity, said cap encapsulating said annular cavity and said spring biasing said lips against said cap to thereby seal said annular cavity.

* * * * *